United States Patent
Yamamoto

(10) Patent No.: US 11,789,671 B2
(45) Date of Patent: Oct. 17, 2023

(54) SPECIFIC COMMUNICATION DEVICE, AND NON-TRANSITORY COMPUTER-READABLE RECORDING MEDIUM STORING COMPUTER READABLE INSTRUCTIONS FOR SPECIFIC COMMUNICATION DEVICE

(71) Applicant: BROTHER KOGYO KABUSHIKI KAISHA, Nagoya (JP)

(72) Inventor: Ryo Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/057,815

(22) Filed: Nov. 22, 2022

(65) Prior Publication Data

US 2023/0168848 A1 Jun. 1, 2023

(30) Foreign Application Priority Data

Nov. 30, 2021 (JP) ................................ 2021-194312

(51) Int. Cl.
*G06F 3/12* (2006.01)
(52) U.S. Cl.
CPC ............ *G06F 3/121* (2013.01); *G06F 3/1205* (2013.01); *G06F 3/1224* (2013.01)
(58) Field of Classification Search
None
See application file for complete search history.

(56) References Cited

U.S. PATENT DOCUMENTS

2013/0163038 A1  6/2013  Oishi
2015/0036170 A1*  2/2015  Miyake ................. G06F 3/1238
                                                        358/1.14

(Continued)

FOREIGN PATENT DOCUMENTS

JP          2013131016 A       7/2013

OTHER PUBLICATIONS

Extended European Search Report dated May 4, 2023 from related EP 22 20 8489.9.

*Primary Examiner* — Miya J Cato
(74) *Attorney, Agent, or Firm* — Scully, Scott, Murphy & Presser, PC

(57) ABSTRACT

A specific communication device may include a controller configured to, in a case where a first registration instruction according to a registration program and first authentication information are received from a first terminal device comprising the registration program, send a first registration request including specific identification information for identifying the specific communication device and the first authentication information to a predetermined server, in a case where a second registration instruction not according to the registration program is received from a second terminal device, send an authentication information request to the predetermined server, in a case where the authentication information request is sent to the predetermined server, receive second authentication information from the predetermined server, and in a case where the second authentication information is received from the predetermined server, send a second registration request including the specific identification information and the second authentication information to the predetermined server.

11 Claims, 9 Drawing Sheets

(56) References Cited

U.S. PATENT DOCUMENTS

| | | | |
|---|---|---|---|
| 2016/0070511 A1* | 3/2016 | Nishida | G06F 3/1204 |
| | | | 358/1.14 |
| 2018/0069718 A1* | 3/2018 | Terao | H04L 12/28 |
| 2019/0050170 A1 | 2/2019 | Ren et al. | |
| 2021/0306430 A1* | 9/2021 | Tsuji | H04L 67/51 |

\* cited by examiner

SPECIFIC COMMUNICATION DEVICE, AND NON-TRANSITORY COMPUTER-READABLE RECORDING MEDIUM STORING COMPUTER READABLE INSTRUCTIONS FOR SPECIFIC COMMUNICATION DEVICE

REFERENCE TO RELATED APPLICATION

This application claims priority to Japanese Patent Application No. 2021-194312 filed on Nov. 30, 2021. The entire content of the priority application is incorporated herein by reference.

BACKGROUND ART

A system including an image forming apparatus and a print mediating server is known. The image forming apparatus registers information of the image forming apparatus in the print mediating server when the image forming apparatus accepts a registration operation from a user.

DESCRIPTION

The present disclosure discloses a communication device configured to receive a plurality of types of registration instructions from terminal device(s). In particular, a communication device configured to execute suitable processes according to types of registration instructions is disclosed.

A specific communication device disclosed herein may comprise: a controller, wherein the controller may be configured to: in a case where a first registration instruction according to a registration program and first authentication information are received from a first terminal device comprising the registration program, send a first registration request including specific identification information for identifying the specific communication device and the first authentication information to a predetermined server, wherein the registration program may be a program for registering, in the predetermined server, a plurality of pieces of identification information for identifying a plurality of communication devices including the specific communication device, and the first authentication information may be authentication information which the first terminal device has obtained from the predetermined server according to the registration program; in a case where a second registration instruction not according to the registration program is received from a second terminal device, send an authentication information request to the predetermined server; in a case where the authentication information request is sent to the predetermined server, receive second authentication information from the predetermined server; and in a case where the second authentication information is received from the predetermined server, send a second registration request including the specific identification information and the second authentication information to the predetermined server.

According to the above configuration, the specific communication device is configured to receive the first registration instruction and the second registration instruction. When the specific communication device receives the first registration instruction and the first authentication information from the first terminal device, the specific communication device sends the first registration request including the specific identification information and the first authentication information to the predetermined server. When the specific communication device receives the second registration instruction from the second terminal device, the specific communication device receives the second authentication information from the predetermined server and sends the second registration request including the specific identification information and the second authentication information to the predetermined server. As described above, the specific communication device can execute suitable processes in accordance with the types of the registration instructions.

The above computer-readable instructions for implementing the above communication device and a computer-readable recording medium storing the above computer-readable instructions are also novel and useful. Further, a method implemented by the above communication device is also novel and useful. Further, a communication system including the above specific communication device and other device(s) (e.g., a predetermined server and a first terminal device) is also novel and useful.

Figure 1:
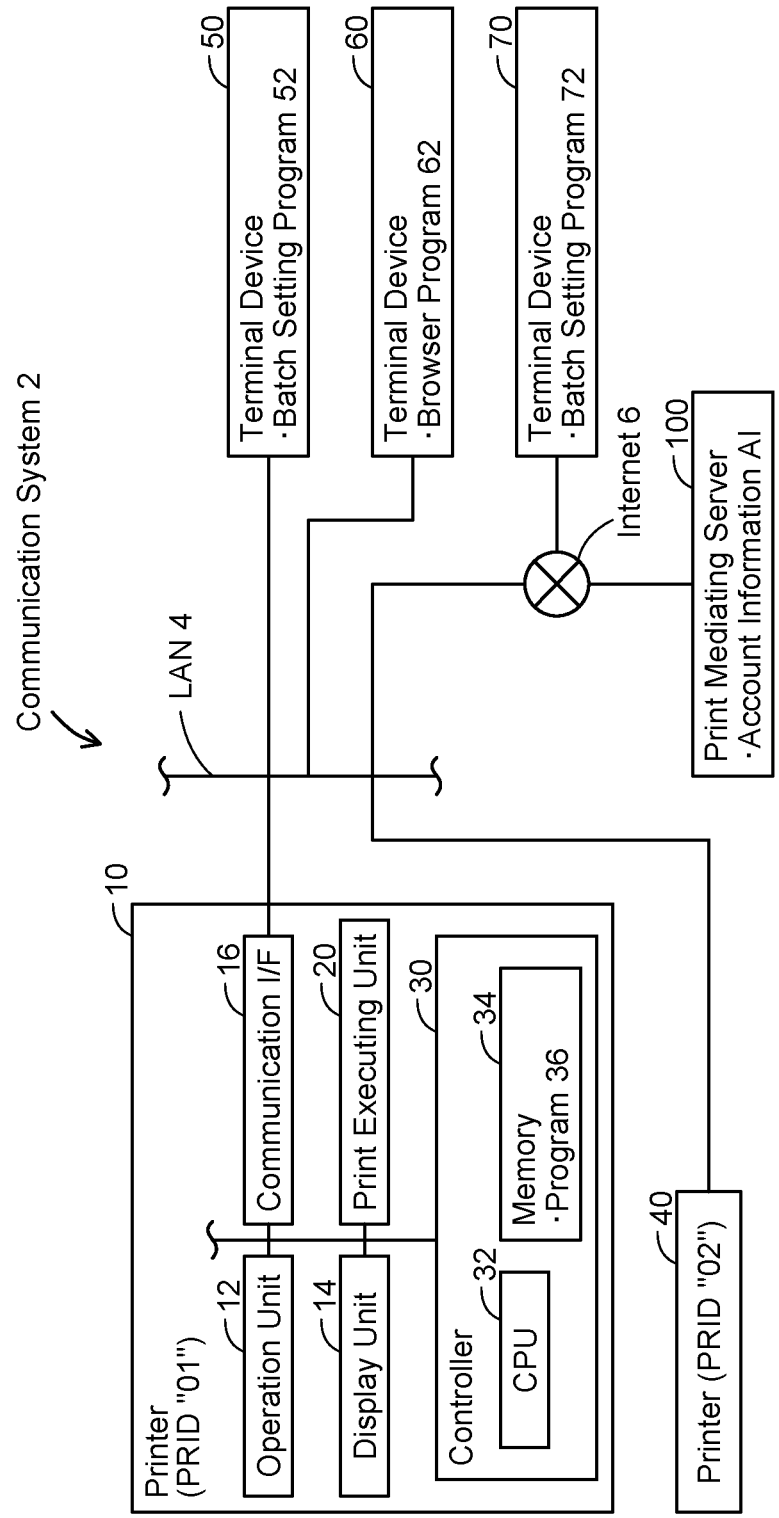
FIG. 1 illustrates a configuration of a communication system.

EMBODIMENT (Configuration of Communication System 2; FIG. 1)

As illustrated in FIG. 1, a communication system 2 includes printers 10, 40, terminal devices 50 to 70, and a print mediating server 100. In the present embodiment, information on the printers 10, 40 is registered in the print mediating server 100 using the terminal devices 50 to 70. Consequently, the printers 10, 40 are implemented to execute printing via the print mediating server.

The printers 10, 40 and the terminal devices 50, 60 are connected to a Local Area Network (LAN) 4. The devices 10, 40, 50, 60 are configured to communicate with each other via the LAN 4. The LAN 4 may be a wireless or wired LAN. The LAN 4 is connected to the Internet 6. The print mediating server 100 is provided on the Internet 6. The printers 10, 40 and the terminal devices 50, 60 are configured to communicate with the print mediating server 100 via the Internet 6. The terminal device 70 is connected to a LAN (not illustrated) different from the LAN 4.

(Configuration of Printer 10)

The printer 10 is a peripheral device configured to execute a printing function (i.e., a peripheral device of the terminal device 50 and the like). The printer 10 may be multi-function apparatus configured to execute a scan function, a facsimile function and the like, as well as the printing function. The printer 10 includes an operation unit 12, a display unit 14, a communication interface 16, a print executing unit 20 and a controller 30. Each of the units 12 to 30 is connected to a bus line (reference sign omitted). A PRID "01", which is identification information for identifying the printer 10, is given to the printer 10. Hereafter, an interface will be referred to as "I/F".

The operation unit 12 includes a plurality of keys. A user can input various instructions on the printer 10 by operating the operation unit 12. The display unit 14 is a display for displaying various information. The display unit 14 also functions as a so-called touch screen (i.e., operation unit). The print executing unit 20 is a printing mechanism of an inkjet scheme. The print executing unit 20 may be a laser scheme, or the like. The communication OF 16 is connected to the LAN 4.

The controller 30 includes a CPU 32 and a memory 34. The CPU 32 is configured to execute various processes according to a program 36 stored in the memory 34. The memory 34 is configured of a volatile memory, a nonvolatile memory, and the like.

(Configuration of Printer 40)

The printer 40 includes the same configuration as the printer 10. A PRID "02", which is identification information for identifying the printer 40, is given to the printer 40.

(Configurations of Terminal Devices 50 to 70)

Each of the terminal devices 50 to 70 may be a portable PC or a desktop PC. The terminal device 50 stores a batch setting program 52. The batch setting program 52 is a program for registering, in the print mediating server 100, a plurality of pieces of identification information for identifying a plurality of printers at once.

The terminal device 60 stores a browser program 62. The browser program 62 is a program for accessing a webserver and displaying a screen represented by image data received from the webserver. The terminal device 70 stores a batch setting program 72 identical to the batch setting program 52.

(Configuration of Print Mediating Server 100)

The print mediating server 100 is a server which provides a service to mediate printing. In other words, the print mediating server 100 converts, for example, image data received from the terminal device 50 to generate print data, and sends this print data to the printer 10, for example. In the present embodiment, the print mediating server 100 is not a server provided by a vendor of the printers 10, 40 but is provided by an operator providing a cloud printing service. In a modification, the print mediating server 100 may be a server provided by the vendor of the printers 10, 40. Hereafter, the print mediating server 100 will simply be referred to as "server 100".

(Registration Process: FIGS. 2 to 9)

With reference to FIGS. 2 to 9, a process of registering a PRID of a printer (e.g., 10, 40) in the server 100 to receive a service from the server 100 will be described. Hereafter, when processes executed by the CPU 32 of the printer 10 according to the program 36 are explained, a first terminal task 10A, a second terminal task 10B and a server print task 10C may be described as subjects of the processes. Each of the terminal tasks 10A, 10B is a task mainly for executing communication with the terminal devices 50 to 70. In particular, the first terminal task 10A is a task for executing communication with the terminal device 50 which operates according to the batch setting program 52 and the like. The second terminal task 10B is a task for executing communication with the terminal device 60 which operates according to the browser program 62. The server print task 10C is a task mainly for executing communication with the server 100. All the communication below executed by the printer 10 is executed via the communication I/F 16. Therefore, hereafter, a phrase "via the communication I/F 16" will be omitted when processes related to communication are explained.

Figure 2:
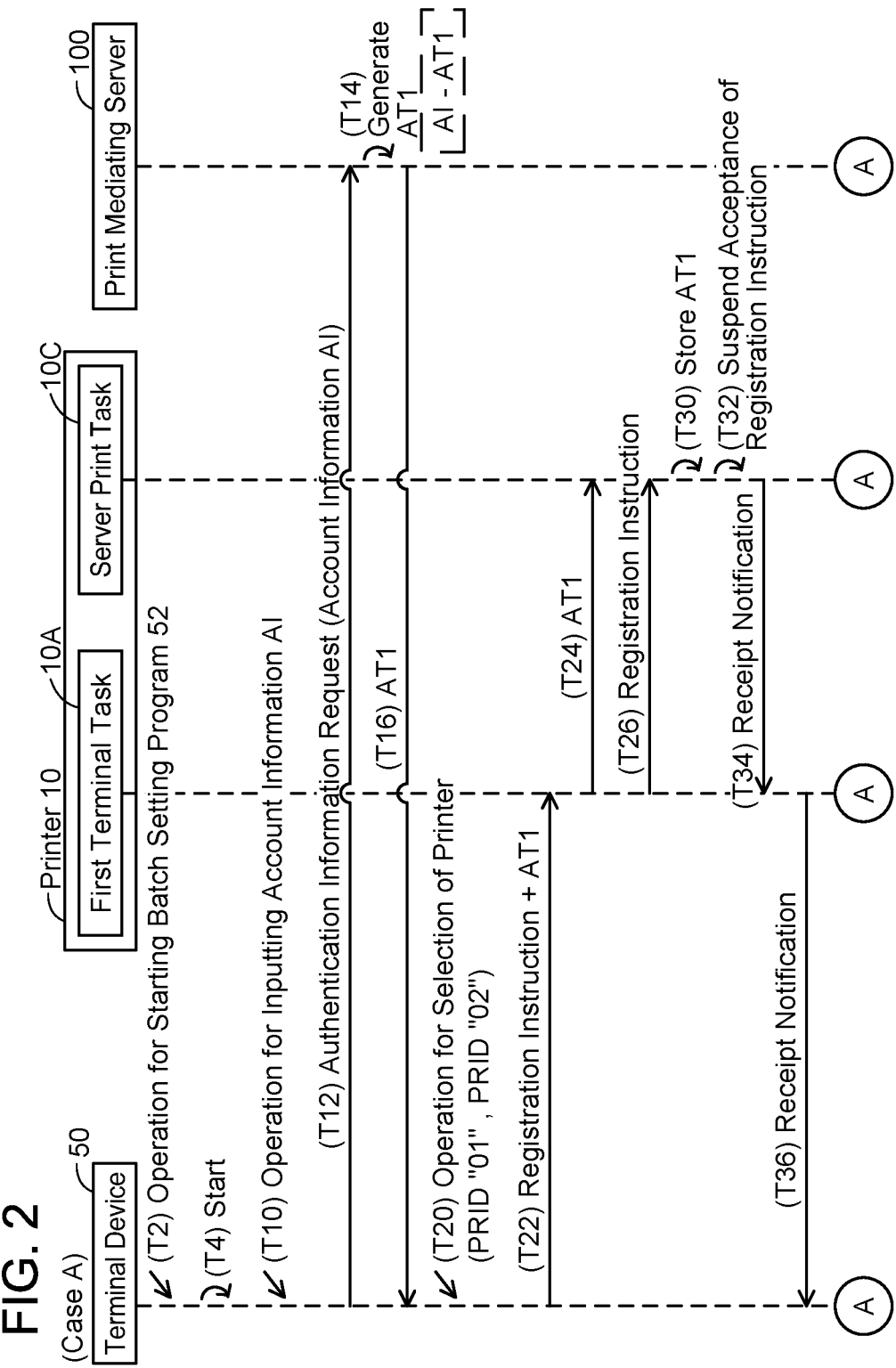
FIG. 2 illustrates a sequence diagram of a process of registering identification information of a printer in a print mediating server according to a batch setting program.
Figure 3:
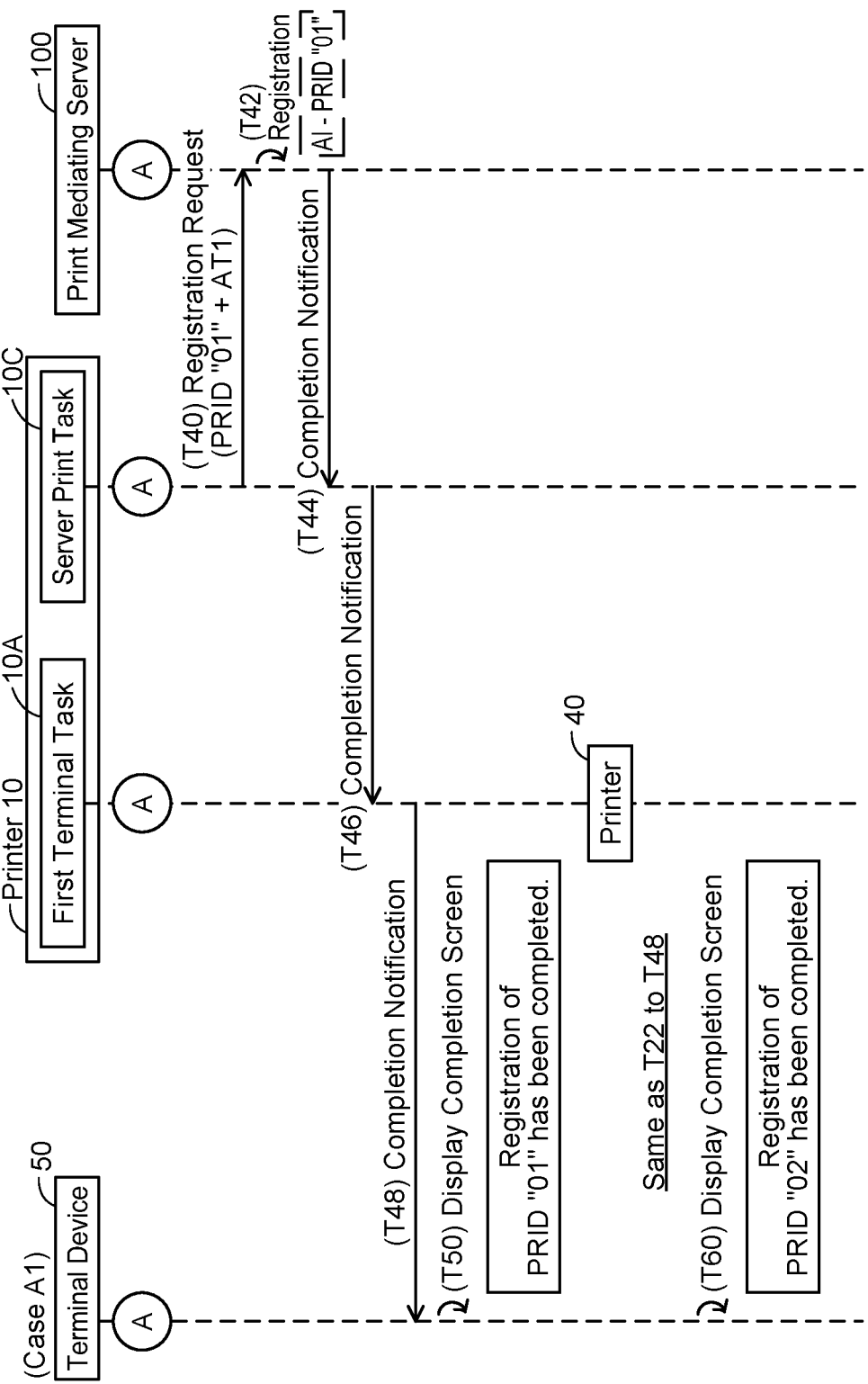
FIG. 3 illustrates a sequence diagram of Case A1, continued from FIG. 2.
Figure 4:
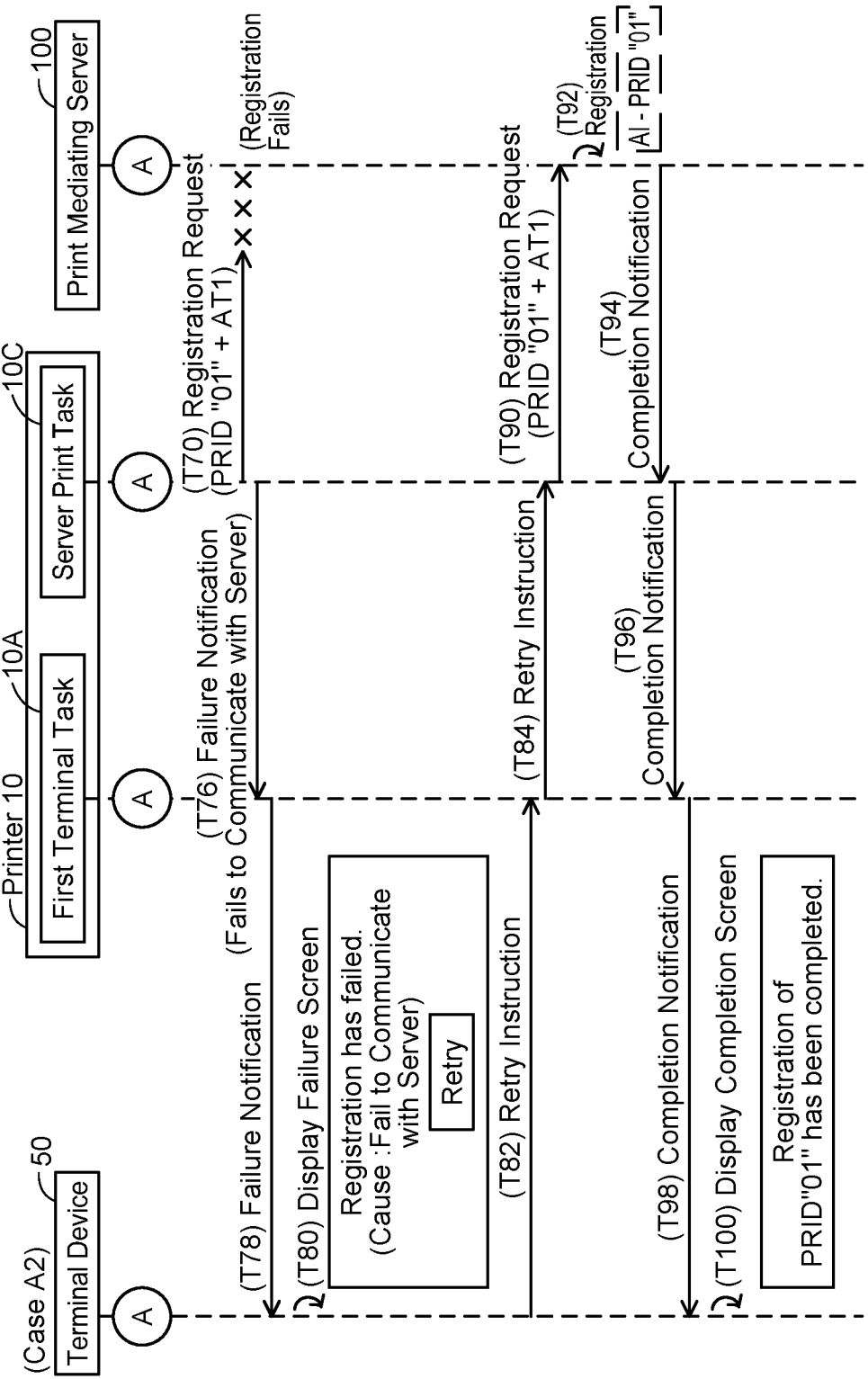
FIG. 4 illustrates a sequence diagram of Case A2, continued from FIG. 2.

(Process in which Batch Setting Program 52 is Used (Case A): FIG. 2 to FIG. 4)

With reference to FIG. 2 to FIG. 4, a case in which the batch setting program 52 is used will be described. When the terminal device 50 accepts an operation to start the batch setting program 52 from an administrator of the printer 10 and the like in T2, the terminal device 50 starts the batch setting program 52 in T4. Consequently, the terminal device 50 executes the following processes according to the batch setting program 52.

The terminal device 50 accepts an operation to input account information AI from the administrator in T10. The account information AI includes, for example, a user ID and a password. The administrator has already registered, in the server 100, the account information AI to use the server 100 before the process of FIG. 2. The administrator inputs the registered account information AI in the terminal device 50 in T10. In T12, the terminal device 50 sends an authentication information request including the inputted account information AI to the server 100.

When the server 100 receives the authentication information request from the terminal device 50 in T12, the server 100 executes authentication of the account information AI included in the received authentication information request. When the server 100 stores the account information AI, in other words, when authentication of the account information AI succeeds, the server 100 generates AT1, which is an access token which is a unique letter string (hereafter referred to as AT (Access Token)) in T14. The server 100 stores the account information AI and the AT1 in association with each other. Next, the server 100 sends the generated AT1 to the terminal device 50 in T16.

Although the illustration is omitted, when the terminal device 50 receives the AT1 from the server 100 in T16, the terminal device 50 searches for a printer connected to the LAN 4. The terminal device 50 displays the PRID "01", PRID "02" of the printers 10, 40 which were found in the search. In T20, the terminal device 50 accepts an operation to select the PRID "01" and PRID "02" from the administrator. Consequently, the administrator can select the plurality of printers 10, 40 to be registered. In a modification, in T20, the terminal device 50 may accept an operation to input IP addresses of the printers 10, 40 from the administrator. In this case, the terminal device 50 may not search for a printer connected to the LAN 4 in T16. Next, in T22, the terminal device 50 sends a registration instruction and the AT1 to the printer 10. The registration instruction is a command of instruction to register a PRID in the server 100. The registration instruction sent according to the batch setting program 52 includes information indicating that the registration information is a command according to the batch setting program 52.

When the first terminal task 10A receives the registration instruction and the AT1 from the terminal device 50 in T22, the first terminal task 10A acknowledges that this registration instruction is a command according to the batch setting program 52 based on the information included in this registration instruction. In this case, the first terminal task 10A supplies the AT1 to the server print task 10C in T24. Then, the first terminal task 10A supplies the registration instruction to the server print task 10C in T26. As described above, since the first terminal task 10A supplies the registration instruction after it supplies the AT1, the server print task 10C can suitably send the registration request including the AT1 to the server 100.

When the server print task 10C obtains the AT1 from the first terminal task 10A in T24 and obtains the registration request from the first terminal task 10A in T26, the server print task 10C stores the AT1 in the memory 34. Next, the server print task 10C suspends acceptance of the registration instruction in T32. Next, the server print task 10C supplies a receipt notification to the first terminal task 10A in T34. The receipt notification is a notification indicating that the AT1 has been received.

When the first terminal task 10A obtains the receipt notification from the server print task 10C in T34, the first terminal task 10A sends the receipt notification to the terminal device 50 in T36.

When the terminal device 50 receives the receipt notification from the printer 10 in T36, the terminal device 50 displays a message indicating that the printer 10 has received the AT1 and the registration instruction, although this is not illustrated. Consequently, the administrator can acknowledge that the printer 10 has received the AT1 and the registration instruction.

(Case A1: FIG. 3)

As illustrated in FIG. 3, in T40, the server print task 10C sends a registration request including the PRID "01" and the AT1 to the server 100. This registration request is a command to requesting the server 100 to register the PRID "01".

When the server 100 receives the registration request from the printer 10 in T40, the server 100 executes authentication of the AT1 included in the registration request in T42. Since the server 100 has already stored the AT1 (see T14 of FIG. 2), the server 100 determines that authentication of the AT1 has succeeded. Then, the server 100 identifies the account information AI stored in association with the AT1 (see T14 of FIG. 2) and stores the identified account information AI and the PRID "01" included in the registration request in association with each other. Next, in T44, the server 100 sends a completion notification which indicates that registration of the PRID "01" has been completed to the printer 10.

When the server print task 10C receives the completion notification from the server 100 in T44, the server print task 10C supplies the completion notification to the first terminal task 10A in T46.

When the first terminal task 10A obtains the completion notification from the server print task 10C in T46, the first terminal task 10A sends the completion notification to the terminal device 50 in T48.

When the terminal device 50 receives the completion notification from the printer 10 in T48, the terminal device 50 displays a message indicating that registration of the PRID "01" has been completed in T50. Consequently, the administrator can acknowledge that registration of the PRID "01" in the server 100 has been completed.

Next, the terminal device 50 executes processes for the printer 40 which has the PRID "02" selected in T20 in FIG. 2 as with the processes for the printer 10. Consequently, processes which are the same as the processes of T22 to T48 are executed among the terminal device 50, the printer 40, and the server 100. However, in these processes, the PRID "02" which is identification information of the printer 40 is used instead of the PRID "01". Consequently, the PRID "02" is registered in the server 100 in association with the account information AI. In T60, the terminal device 50 displays a completion screen which indicates that registration of the PRID "02" has been completed.

As described above, by distributing the common AT1 to each of the printers 10, 40 according to the batch setting program 52, the terminal device 50 can register the PRID "01", the PRID "02" of the printers 10, 40 in the server 100. Accordingly, the administrator can register the PRID "01", the PRID "02" of the printers 10, 40 in the server 100 by selecting the printers 10, 40 to be registered in T20 of FIG. 2 without separately accessing the webservers installed in the printers 10, 40. Therefore, convenience for the administrator can be enhanced. Further, since the server 100 does not need to generate different ATs for the printers 10, 40, processing load on the server 100 can be reduced.

As described above, when the PRID "01", the PRID "02" of the printers 10, 40 are registered in the server 100, the user can cause the printer 10 and the like to execute printing via the server 100 using a terminal device (e.g., 50, 60). Specifically, the user accesses the server 100 using the terminal device, selects for example the PRID "01" registered in the server 100, and sends image data representing an image to be printed to the server 100. In this case, the server 100 converts the image data to generate print data having a data format which can be interpreted by the printer 10, and sends the print data to the printer 10. Consequently, the printer 10 can execute printing according to the print data. In a modification, the server 100 may not convert image data. The printer 10 may receive the image data from the server 100, convert the received image data to generate print data, and execute printing according to the generated print data.

(Case A2: FIG. 4)

Next, with reference to FIG. 4, Case A2 in which the registration request from the printer 10 to the server 100 is not received by the server 100 will be described. In T70, the server print task 10C tries to send the registration request to the server 100. However, when for example the server 100 fails, the registration request is not received by the server 100, as a result of which the PRID "01" is not registered in the server 100.

When the server print task 10C does not receive the completion notification from the server 100 even after a predetermined time since the registration request was sent to the server 100, the server print task 10C supplies, to the first terminal task 10A, a failure notification indicating that registration of the PRID "01" has failed in T76. The failure notification further includes cause information indicating the cause of the failure of registration. For example, when the server 100 fails, no notification is received from the server 100. In this case, the failure notification includes the cause information indicating that communication with the server 100 cannot be executed. Further, when for example the authentication of the AT1 failed in the server 100 (e.g., when validity of the AT1 is expired), the failure information includes the cause information indicating authentication failure.

When the first terminal task 10A obtains the failures notification from the server print task 10C in T76, the first terminal task 10A sends the failure notification to the terminal device 50 in T78.

When the terminal device 50 receives the failure notification from the printer 10 in T78, the terminal device 50 displays a failure screen including a message indicating that registration has failed in T80. The failure screen includes a message indicating the cause information. Consequently, the administrator can acknowledge that registration has failed and the cause of the registration failure. The failure screen further includes a retry button for causing the printer 10 to execute sending of the registration request again.

When the retry button included in the failure screen is selected by the administrator, the terminal device 50 sends a retry instruction to the printer 10 in T82 without sending the AT1 to the printer 10.

When the first terminal task 10A receives the retry instruction from the terminal device 50 in T82, the first terminal task 10A supplies the retry instruction to the server print task 10C in T84.

When the server print task 10C obtains the retry instruction from the first terminal task 10A in T84, the server print task 10C resends the registration request to the server 100 in T90. This registration request includes the PRID "01" and the AT1 stored in the memory 34 (see T30 of FIG. 2). As described above, since the printer 10 keeps the AT1 in the memory 34, the printer 10 does not need to receive the AT1 again when receiving the retry instruction from the terminal device 50. Consequently, the communication load between the printer 10 and the terminal device 50 can be reduced.

For example, when the server 100 recovers from failure, the server 100 receives the registration request from the printer 10 in T90. In this case, the server 100 stores the PRID "01" and the account information AI in association with each other in T92. The processes of T94 to T100 executed thereafter are the same as the processes of T44 to T50 of FIG. 3.

Figure 5:
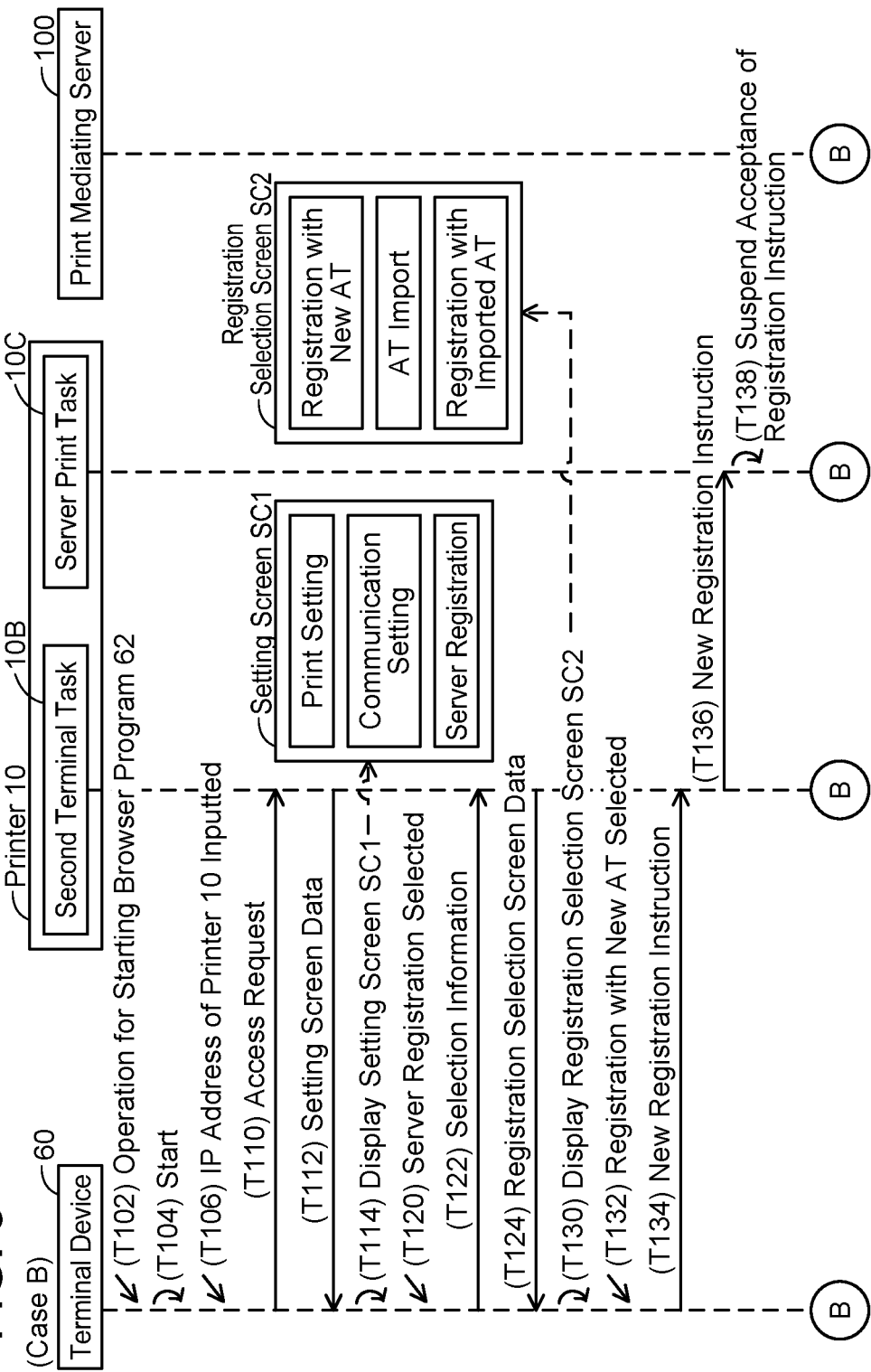
FIG. 5 illustrates a sequence diagram of a process of registering identification information of a printer in a print mediating server according to a browser program.
Figure 6:
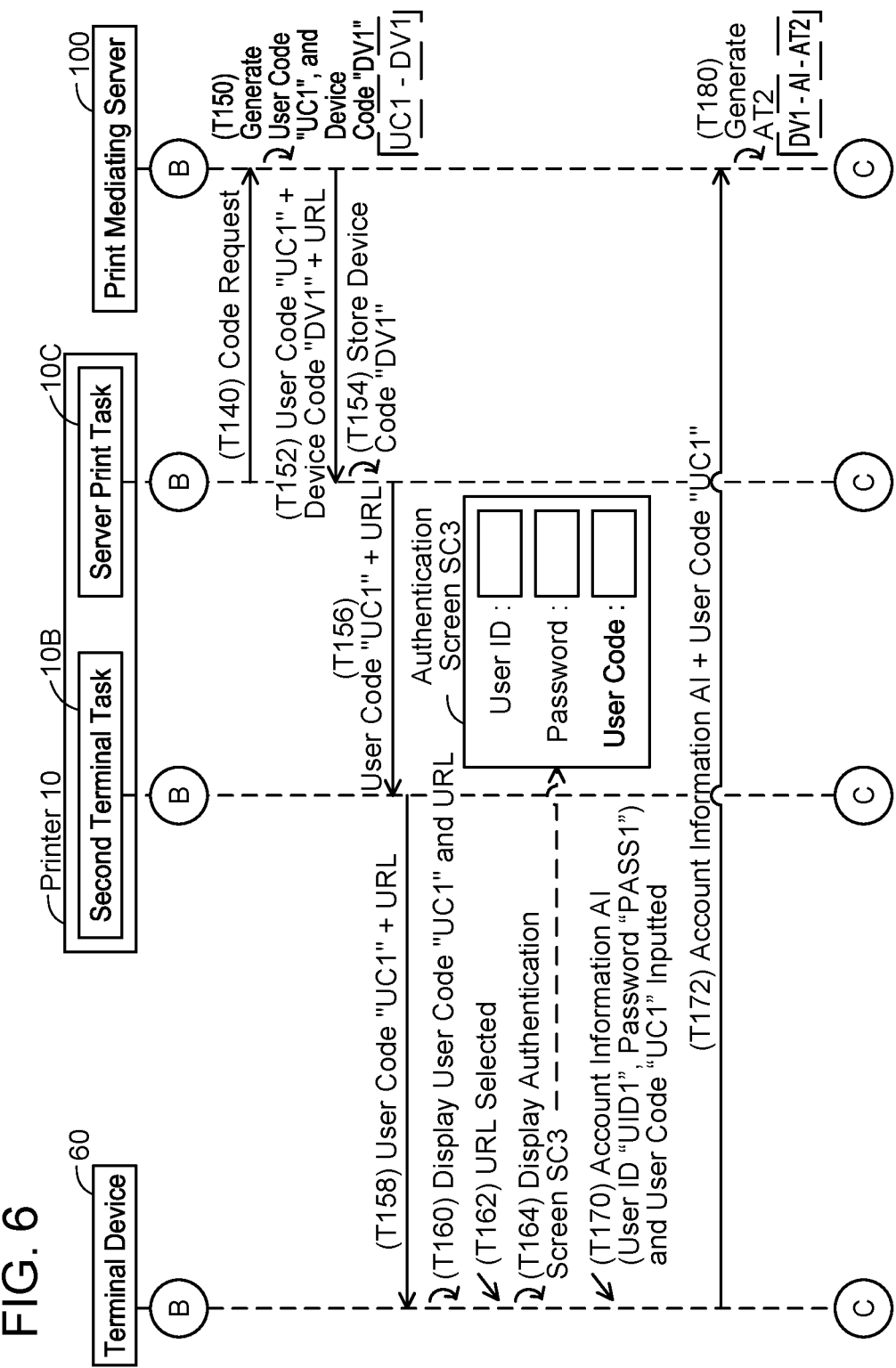
FIG. 6 illustrates a sequence diagram continued from FIG. 5.
Figure 7:
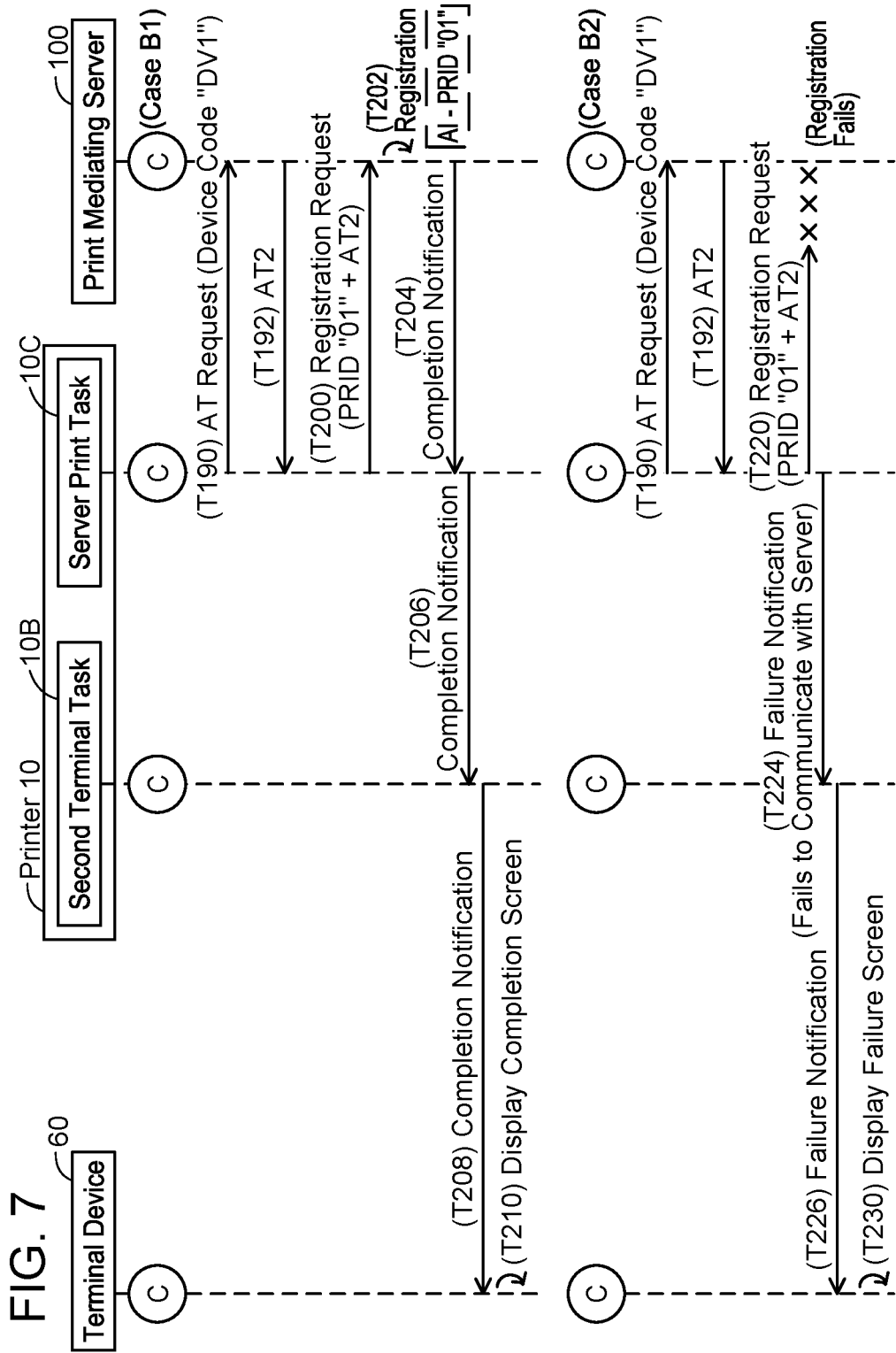
FIG. 7 illustrates a sequence diagram continued from FIG. 6.

(Process in which Browser Program 62 is Used (Case B): FIG. 5 to FIG. 7)

With reference to FIG. 5 to FIG. 7, a case in which the browser program 62 is used will be described. When the terminal device 60 accepts an operation to start the browser program 62 from the administrator of the printer 10 and the like in T102, the terminal device 60 starts the browser program 62 in T104. Consequently, the terminal device 60 executes the following processes according to the browser program 62.

The terminal device 60 accepts input of the IP address of the printer 10 from the administrator in T106. Next, the terminal device 60 sends an access request to the printer 10 in T110. The access request is a command for requesting access to the webserver in the printer 10.

The second terminal task 10B is a task for the printer 10 to function as a webserver, and the second terminal task 10B receives the access request from the terminal device 60 in T110. In this case, the second terminal task 10B sends setting screen data to the terminal device 60 in T112.

When the terminal device 60 receives the setting screen data from the printer 10 in T112, the terminal device 60 displays a setting screen SC1 represented by the setting screen data in T114. The setting screen SC1 includes a print setting button for changing printing settings of the printer 10, a communication setting button for changing communication settings of the printer 10, and a server registration button for registering the PRID "01" of the printer 10 in the server 100.

When the terminal device 60 accepts selection of the server registration button in the setting screen SC1 from the administrator in T120, the terminal device 60 sends selection information indicating that the server registration button has been selected to the printer 10 in T122.

When the second terminal task 10B receives the selection information from the terminal device 60 in T122, the second terminal task 10B sends registration selection screen data to the terminal device 60 in T124.

When the terminal device 60 receives the registration selection screen data from the printer 10 in T124, the terminal device 60 displays a registration selection screen SC2 represented by the registration selection screen data in T130. The registration selection screen SC2 includes a new registration button, an AT import button and an import registration button. The new registration button is a button for obtaining a new AT from the server 100 to register the PRID "01" in the server 100. The AT import button is a button for importing the AT to the printer 10. The import registration button is a button for using an imported AT to register the PRID "01" in the server 100.

When the terminal device 60 accepts selection of the new registration button included in the registration selection screen SC2 from the administrator in T132, the terminal device 60 sends the new registration instruction to the printer 10 in T134. The new registration instruction does not include information indicating that it is a command according to the batch setting program 52 but includes information indicating that it is a command for the webserver in the printer 10.

When the second terminal task 10B receives the new registration information from the terminal device 60 in T134, the second terminal task 10B acknowledges that the new registration instruction is a command for the webserver based on the information included in the new registration instruction. In this case, the second terminal task 10B supplies the new registration instruction to the server print task 10C in T136.

When the server print task 10C obtains the new registration instruction from the second terminal task 10B in T136, the server print task 10C suspends acceptance of the registration instruction in T138.

(Continuation of FIG. 5: FIG. 6)

As illustrated in FIG. 6, the server print task 10C sends a code request to the server 100 in T140. The code request is a command to request for issuance of a code to be temporarily used.

When the server 100 receives the code request from the printer 10 in T140, the server 100 generates a user code "UC1" and a device code "DV1" in T150 and stores them in association with each other. Next, the server 100 sends the user code "UC1", a Uniform Resource Locator (URL) and the device code "DV1" to the printer 10 in T152. This URL is information indicating a location of authentication screen data in the server 100 to be described later.

When the server print task 10C receives the user code "UC1", the URL and the device code "DV1" from the server 100 in T152, the server print task 10C stores the device code "DV1" in the memory 34 in T154. Next, the server print task 10C supplies the user code "UC1" and the URL to the second terminal task 10B in T156.

When the second terminal task 10B obtains the user code "UC1" and the URL from the server print task 10C in T156, the second terminal task 10B sends them to the terminal device 60 in T158.

When the terminal device 60 receives the user code "UC1" and the URL from the printer 10 in T158, the terminal device 60 displays them in T160. Next, when the terminal device 60 accepts an operation to select the URL from the administrator in T162, the terminal device 60 accesses the URL (i.e., the server 100) and receives authentication screen data from the server 100. Then, the terminal device 60 displays an authentication screen SC3 represented by the authentication screen data in T164. The authentication screen SC3 includes a user ID input box to input a user ID, a password input box to input a password and a user code input box to input a user code.

The administrator has already registered the account information AI (e.g., a user ID and a password) to use the server 100 in the server 100 before the process of FIG. 5. In T170, the terminal device 60 accepts input of the account information AI (i.e., the user ID "UD1" and the password "PASS1") and the user code "UC1" from the administrator. In T172, the terminal device 60 sends the inputted account information AI and the user code "UC1" to the server 100.

When the server 100 receives the account information AI and the user code "UC1" from the terminal device 60 in T172, the server 100 executes authentication of the received account information AI. When the server 100 stores the account information AI, in other words, when the authentication of the account information AI succeeds, the server 100 identifies the device code "DV1" stored in association with the received user code "UC1" (see T150). Then, the server 100 generates an access token AT2 which is a unique character string in T180. Further, the server 100 stores the device code "DV1", the account information AI and the generated AT2 in association with each other.

(Case B1: FIG. 7)

When the server print task 10C receives the respective pieces of information from the server 100 in T152 of FIG. 6, the server print task 10C starts to repeatedly send an AT request including the device code "DV1" stored in the memory 34 (see T154 of FIG. 6) to the server 100.

When the server 100 receives the AT request including the device code "DV1" from the printer 10 in T190 after the server 100 stored the account information AI, the device code "DV1" and the AT2 in association with each other (i.e., after T180 of FIG. 6), the server 100 sends the AT2 stored in association with the device code "DV1" to the printer 10 in T192.

When the server print task 10C receives the AT2 from the server 100 in T192, the server print task 10C sends a registration request including the PRID "01" and the received AT2 to the server 100 in T200.

When the server 100 receives the registration request from the printer 10 in T200, the server 100 executes authentication of the AT2 included in the registration request in T202. Since the server 100 has already stored the AT2 (see T180), the server 100 determines that authentication of the AT2 has succeeded. Then, the server 100 identifies the account information AI stored in association with the AT2 (see T180) and stores the identified account information AI and the PRID "01" included in the registration request in association with each other. Processes of T204 to T210 executed thereafter are the same as the processes of T44 to T50 of FIG. 3 except that the processes are executed by the second terminal task 10B instead of the first terminal task 10A.

As described above, the terminal device 60 can register the PRID "01" of the printer 10 in the server 100 by accessing the webserver in the printer 10 according to the browser program 62. The administrator can use Case B described above not in the situation in which a plurality of PRIDs of a plurality of printers is to be registered in the server 100 at once but in the situation in which one PRID "01" of one printer 10 alone is to be registered in the server 100.

(Case B2)

Next, Case B2 in which the registration request from the printer 10 to the server 100 is not received by the server 100 will be described. T190 to T192 are the same as Case B1. The server print task 10C tries to send the registration request to the server 100 in T220. However, when for example the server 100 fails, the registration request is not received by the server 100 and the PRID "01" is not registered in the server 100.

The processes of T224 to T230 to be executed thereafter are the same as the processes of T76 to T80 of FIG. 4 except that the processes are executed by the second terminal task 10B instead of the first terminal task 10A.

Figure 8:
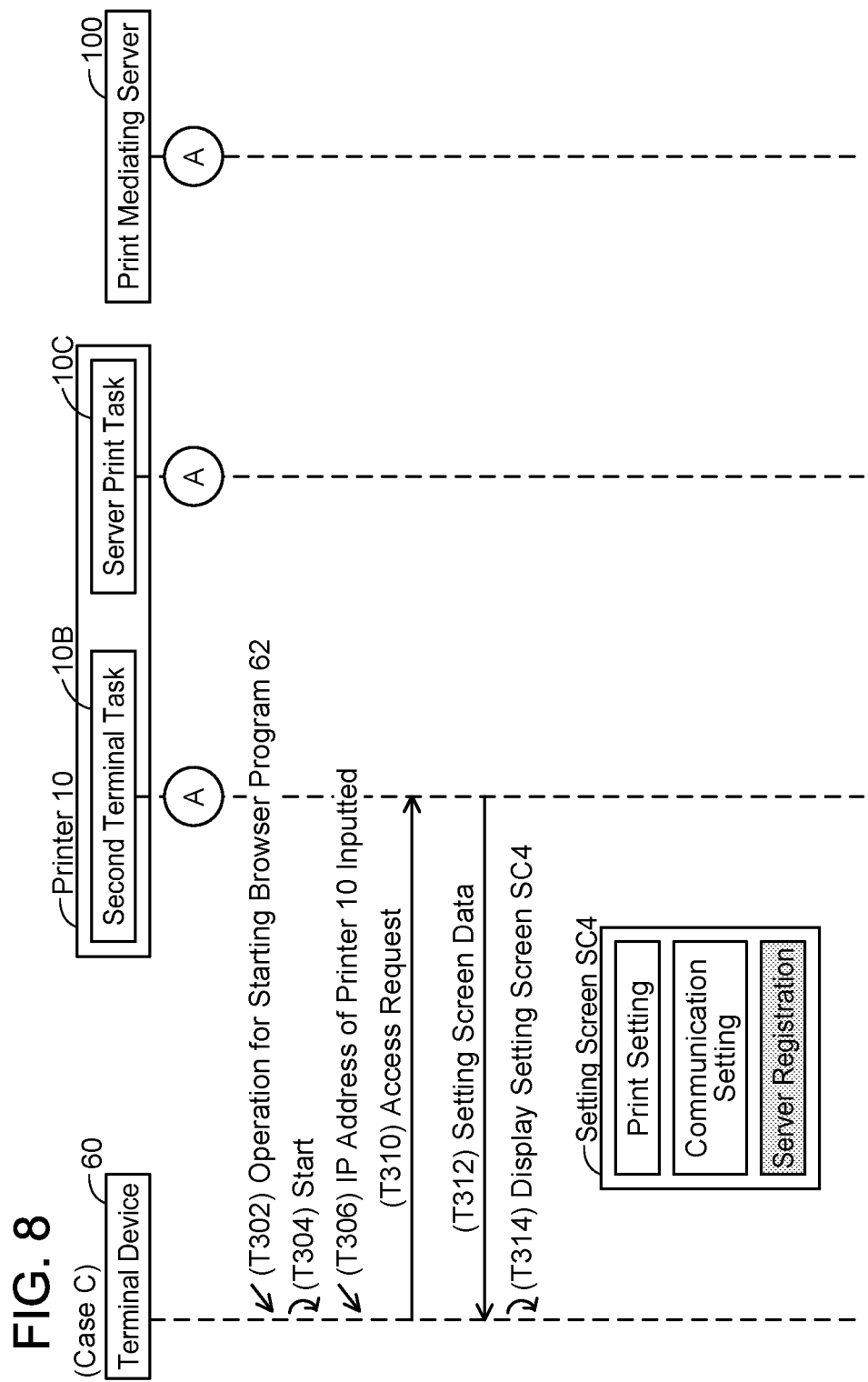
FIG. 8 illustrates a sequence diagram of Case C, continued from FIG. 2.

(Case C: FIG. 8)

Next, with reference to FIG. 8, a case in which the printer 10 receives an access request according to the browser program 62 from the terminal device 60 after the printer 10 received the registration instruction according to the batch setting program 52 from the terminal device 50 (see T22 of FIG. 2) will be described. FIG. 8 illustrates a continuation of FIG. 2. In other words, the server print task 10C has suspended acceptance of the registration instruction (see T32 of FIG. 2).

In T302 to T312, the same processes as T102 to T112 of FIG. 5 are executed. However, since the second terminal task 10B acknowledges that the server print task 10C has suspended acceptance of the registration instruction, the second terminal task 10B sends setting screen data different from that of T112 in FIG. 5 to the terminal device 60 in T312. Specifically, in this setting screen data, the server registration button is displayed in a greyed-out manner. In other words, selection of the server registration button is disabled.

When the terminal device 60 receives the setting screen data from the printer 10 in T312, the terminal device 60 displays a setting screen SC4 represented by the setting screen data in T314. As describes above, the server registration button is displayed in the greyed-out manner in the setting screen SC4. The administrator cannot select the server registration button. Therefore, the terminal device 60 cannot send the selection information indicating that the server registration button has been selected (see T122 of FIG. 5) to the printer 10, as a result of which the terminal device 60 cannot receive the registration selection screen data (see T124) from the printer 10. Consequently, the terminal device 60 cannot send the new registration instruction (see T134) to the printer 10.

As illustrated in Case C, the printer 10 does not receive the new registration instruction according to the browser program 62 after receiving the registration instruction according to the batch setting program 52. Consequently, it is possible to prevent an event of the printer 10 redundantly sending the registration request to the server 100.

Figure 9:
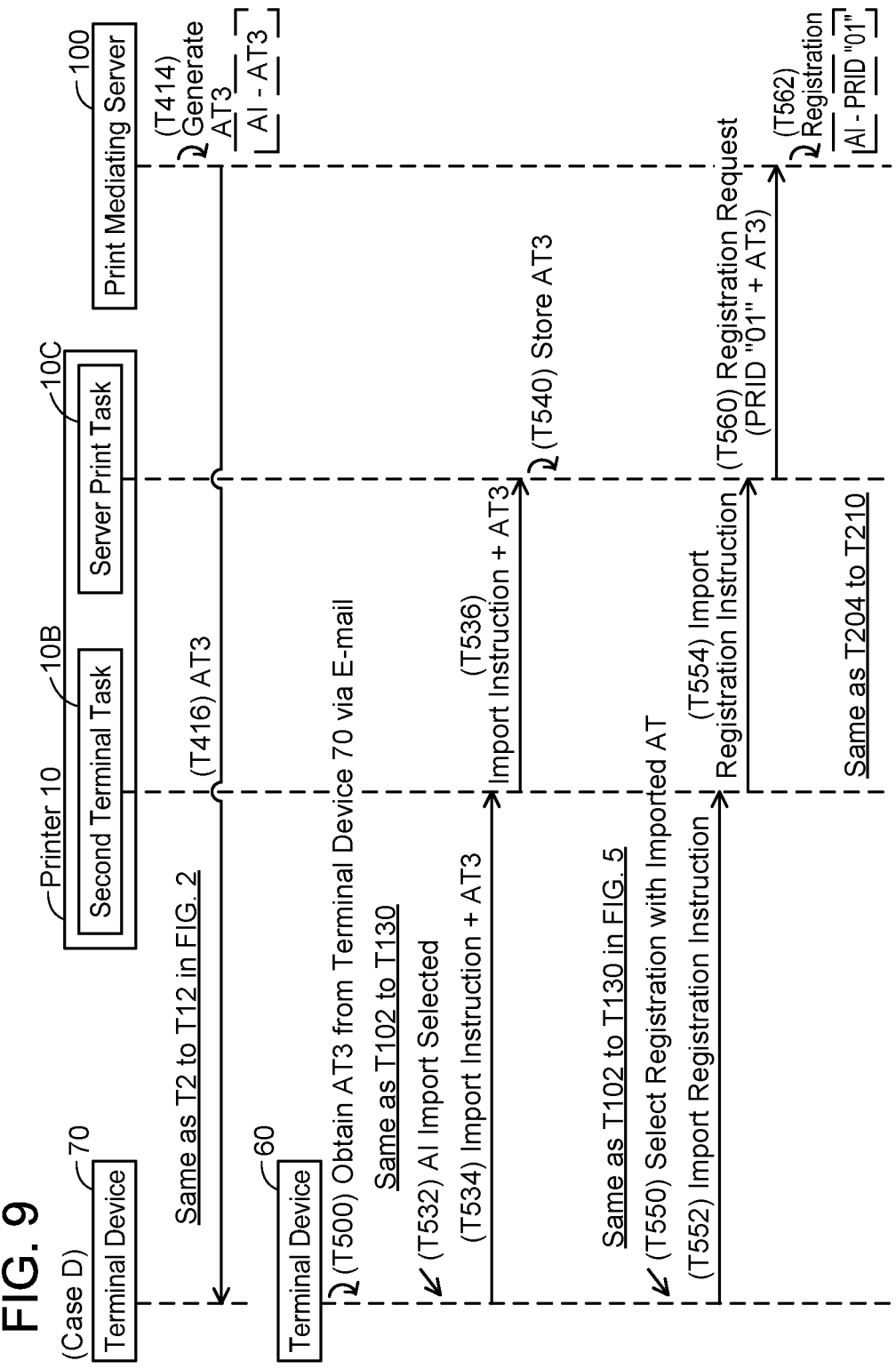
FIG. 9 illustrates a sequence diagram of a process of importing an access token.

(Case D: FIG. 9)

With reference to FIG. 9, Case D in which the terminal device 60 imports an access token to the printer 10 will be described. Case D contemplates for example a situation in which the administrator of the printers 10, 40 are in a remote place. The terminal device 70 used by the administrator does not belong to the LAN 4 to which the printers 10, 40 belong. The administrator uses the terminal device 70 to access the server 100. Consequently, the same processes as T2 to T12 of FIG. 2 are executed between the terminal device 70 and the server 100. Consequently, the server 100 generates an AT3 in T414 and stores the account information AI and the AT3 in association with each other. Next, the server 100 sends the AT3 to the terminal device 70 in T416.

The terminal device 70 receives the AT3 from the server 100 in T416. Then, the terminal device 70 sends an email in which the AT3 is described in its body to an email address of the user of the terminal device 60 in accordance with an instruction from the administrator. Consequently, the administrator can give the AT3 to the user who is not authorized to obtain an access token from the server 100.

The terminal device 60 obtains the AT3 by receiving the email including the AT3 from the terminal device 70 in T500. Thereafter, the user of the terminal device 60 accesses the printer 10 according to an instruction from the administrator. Consequently, the same processes as the processes of T102 to T130 of FIG. 5 are performed between the terminal device 60 and the printer 10.

The terminal device 60 accepts selection of the AT import button included in the registration selection screen SC2 (see T130 of FIG. 5) and selection of the AT3 obtained in T500 from the user in T532. In this case, the terminal device 60 sends an import instruction and the AT3 to the printer 10 in T534. The import instruction does not include information indicating that it is a command according to the batch setting program 52 but includes information indicating that it is a command for the webserver in the printer 10.

When the second terminal task 10B receives the import instruction and the AT3 from the terminal device 60 in T534, the second terminal task 10B acknowledges that the import instruction is a command for the webserver based on the information included in the import instruction. In this case, the second terminal task 10B supplies the import instruction and the AT3 to the server print task 10C in T536.

When the server print task 10C obtains the import instruction and the AT3 from the second terminal task 10B in T536, the server print task 10C stores the obtained AT3 in the memory 34 in T540. As described above, since the AT3 has been imported to the printer 10, the printer 10 can send the registration request to the server 100 using the AT3 once it receives an import registration instruction to be described.

Thereafter, the processes of T102 to T130 of FIG. 5 are executed again between the terminal device 60 and the printer 10. In a modification, the terminal device 60 may display the registration selection screen SC2 again after sending the import instruction and the AT3 to the printer 10 in T534. In this case, the processes of T102 to T124 may not be executed again.

In T550, the terminal device 60 accepts selection of the import registration button (see T130 of FIG. 5) included in the registration selection screen SC2 from the administrator. In this case, the terminal device 60 sends an import registration instruction to the printer 10 in T552. The import registration instruction does not include information indicating that it is a command according to the batch setting program 52 but includes information indicating that it is a command for the webserver in the printer 10.

When the second terminal task 10B receives the import registration instruction from the terminal device 60 in T552, the second terminal task 10B acknowledges that the import registration instruction is a command for the webserver based on the information included in the import registration instruction. In this case, the second terminal task 10B supplies the import registration instruction to the server print task 10C in T554.

When the server print task 10C obtains the import registration instruction from the second terminal task 10B in T554, the server print task 10C sends a registration request including the PRID "01" and the AT3 stored in the memory 34 (see T540) to the server 100 in T560.

When the server 100 receives the registration request from the printer 10 in T560, the server 100 executes authentication of the AT3 included in the registration request in T562. Since the server 100 has already stored the AT3 (see T414), the server 100 determines that authentication of the AT3 has succeeded. Then, the server 100 identifies the account information AI stored in association with the AT3 (see T414) and stores the PRID "01" included in the registration request and the identified account information AI in association with each other. Next, the processes as those of T204 to T210 of FIG. 6 are executed among the terminal device 60, the printer 10 and the server 100.

As illustrated in Case D, the printer 10 can register the PRID "01" in the server 100 using the imported AT3 without requesting the server 100 to generate a new access token.

(Effects of Present Embodiment)

The printer 10 of the present embodiment can receive the registration instruction according to the batch setting program 52 (T22 of FIG. 2) and the registration instruction not according to the batch setting program 52 (T134 of FIG. 5). When the printer 10 receives the registration instruction according to the batch setting program 52 and the AT1, the printer 10 sends the registration request including the PRID "01" and the AT1 to the server 100 (T40 of FIG. 3). When the printer 10 receives the registration instruction not according to the batch setting program 52, the printer 10 receives the AT2 from the server 100 (T194 of FIG. 7) and sends the registration request including the PRID "01" and the AT2 to the server 100 (T200). As described above, the printer 10 can execute suitable processes according to the types of the registration instructions.

(Corresponding Relationships)

The printer 10 and the print mediating server 100 are an example of "specific communication device" and "predetermined server", respectively. The batch setting program 52 is an example of "registration program". The registration instruction sent in T22 and the new registration instruction sent in T134 are an example of "first registration instruction" and "second registration instruction", respectively. The AT1, the AT2, and the AT3 are an example of "first authentication information", "second authentication information" and "third authentication information", respectively. The terminal device 50, the terminal device 60, and the terminal device 70 are an example of "first terminal device", "second terminal device", and "third terminal device", respectively. The PRID "01" is an example of "specific identification information". The setting screen SC1 and the setting screen SC4 are an example of "first screen" and "second screen", respectively. The server registration button is an example of "predetermined button".

The processes of T40, T200 and T560 are an example of "send a first registration request", "send a second registration request", and "send a third registration request", respectively. The processes of T190 and T192 are an example of "send an authentication information request" and "receive second authentication information", respectively. The process of T134 is an example of "receive the second registration instruction". The process of T36 is an example of "send a receipt notification". The processes of T48 and T208 are an example of "send a first completion notification" and "send a second completion notification", respectively. The processes of T78 and T226 are an example of "send a first failure notification" and "send a second failure notification", respectively. The processes of T30 and T540 are an example of "store the first authentication information in the memory" and "store the third authentication information in the memory", respectively. The process of T90 is an example of "resend the first registration request". The processes of T112 and T312 are an example of "send a first screen data" and "send second screen data".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1)

The terminal devices 50 to 70 may be different terminal devices as in the above embodiment or may be the same terminal device. In general terms, "first terminal device", "second terminal device" and "third terminal device" may be terminal devices different from one another or may include two or more same terminal devices.

(Modification 2)

The terminal device 60 may store different application program for executing communication with the printer 10 instead of the browser program 62. In this case, the printer 10 may execute communication according to an instruction from the application program with the terminal device 60 to implement the Case B as above. In the present modification, the printer 10 may not function as a webserver.

(Modification 3)

T36 of FIG. 2 may be omitted. In the present modification, "send a receipt notification" can be omitted.

(Modification 4)

At least one of T48 of FIGS. 3 and T208 of FIG. 7 may be omitted. In the present modification, at least one of "send a first completion notification" and "send a second completion notification" can be omitted.

(Modification 5)

At least one process of T78 of FIGS. 4 and T226 of FIG. 7 may be omitted. In the present modification, at least one of "send a first failure notification" and "send a second failure notification" can be omitted. In another modification, the failure notification may not include cause information.

(Modification 6)

T30 of FIG. 2 may be omitted. In this case, the printer 10 may receive the AT1 again from the terminal device 50 when receiving the retry instruction from the terminal device 50. In the present modification, "store the first authentication information in the memory" can be omitted.

(Modification 7)

The printer 10 may send the registration request again to the server 100 without receiving the retry instruction from the terminal device 50 when the printer 10 does not receive the completion notification from the server 100 after a predetermined time elapses since the printer 10 sent the registration request to the server 100. In other words, "retry instruction" is not an indispensable component.

(Modification 8)

In the setting screen SC4 displayed in T314, the server registration button which is greyed out is displayed, however, the server registration button may not be displayed. The setting screen of the present modification as well is an example of "second screen in which selection of the predetermined button is disabled". In another modification, the printer 10 redundantly sending the registration instructions to the server 100 may be permitted. In this case, the server registration button may be enabled in the setting screen SC4. In the present modification, "send second screen data to the second terminal device" can be omitted.

(Modification 9)

The registration selection screen SC2 may not include the AT import button or the import registration button. In the present modification, "store the third authentication information in the memory" and "send a third registration request" can be omitted.

(Modification 10)

The first terminal task 10A may supply the registration instruction to the server print task 10C before supplying the AT1 to the server print task 10C in T24. In general terms, "a task" may supply a first registration instruction to a different task before supplying first authentication information to the different task.

(Modification 11)

In the present embodiment, the print mediating server 100 is constituted of one server. In a modification, however, the print mediating server 100 may be constituted of a plurality of servers. For example, the print mediating server 100 may include a first server for executing processes to generate an access token and the like, a second server for executing processes to register the PRID "01" and a third server for executing mediation of printing.

(Modification 12)

"A specific communication device" may not be the printer 10 but may be a different device such as a scanner, a multi-function apparatus, a PC or a server.

(Modification 13)

In the above embodiment, the processes of FIGS. 2 to 9 are implemented by software, however, at least one of these processes may be implemented by hardware such as a logic circuit.

What is claimed is:

1. A specific communication device comprising:
a controller,
wherein the controller is configured to:
in a case where a first registration instruction according to a registration program and first authentication information are received from a first terminal device comprising the registration program, send a first registration request including specific identification information for identifying the specific communication device and the first authentication information to a predetermined server, wherein the registration program is a program for registering, in the predetermined server, a plurality of pieces of identification information for identifying a plurality of communication devices including the specific communication device, and the first authentication information is authentication information which the first terminal device has obtained from the predetermined server according to the registration program;
in a case where a second registration instruction not according to the registration program is received from a second terminal device, send an authentication information request to the predetermined server;
in a case where the authentication information request is sent to the predetermined server, receive second authentication information from the predetermined server; and
in a case where the second authentication information is received from the predetermined server, send a second registration request including the specific identification information and the second authentication information to the predetermined server.

2. The specific communication device as in claim 1, wherein
the controller is further configured to:
in a state where the specific communication device works as a web server, receive the second registration instruction from the second terminal device by the web server.

3. The specific communication device as in claim 1, wherein
the controller is further configured to:
in a case where the first registration instruction and the first authentication information are received from the first terminal device, send a receipt notification indicating that the first authentication information has been received to the first terminal device.

4. The specific communication device as in claim 1, wherein
the controller is further configured to:
in a case where the specific identification information is registered in the predetermined server in response to the first registration request being sent to the predetermined server, send a first completion notification indicating that registration of the specific identification information has been completed to the first terminal device; and
in a case where the specific identification information is registered in the predetermined server in response to the second registration request being sent to the predetermined server, send a second completion notification indicating that registration of the specific identification information has been completed to the second terminal device.

5. The specific communication device as in claim 1, wherein
the controller is further configured to:
in a case where the specific identification information is not registered in the predetermined server in response to the first registration request being sent to the predetermined server, send a first failure notification indicating that registration of the specific identification information has failed to the first terminal device; and
in a case where the specific identification information is not registered in the predetermined server in response to the second registration request being sent to the predetermined server, send a second failure notification indicating that registration of the specific identification information has failed to the second terminal device.

6. The specific communication device as in claim 5, further comprising:
a memory,
wherein the controller is further configured to:
in a case where the first registration instruction and the first authentication information are received from the first terminal device, store the first authentication information in the memory; and
after the first failure notification has been sent to the first terminal device, resend the first registration request including the specific identification information and the first authentication information in the memory to the predetermined server.

7. The specific communication device as in claim 6, wherein
in a case where a retry instruction according to the registration program is received from the first terminal device without the first authentication information being received from the first terminal device, the controller is configured to resend the first registration request including the specific identification information and the first authentication information in the memory to the predetermined server.

8. The specific communication device as in claim 1, wherein
the controller is further configured to:

in a case where a predetermined screen data request is received from the second terminal device before the first registration instruction is received from the first terminal device, send a first screen data to the second terminal device, the first screen data representing a first screen in which selection of a predetermined button for sending the second registration instruction to the specific communication device is enabled;
in a case where the predetermined button is selected in the first screen after the first screen data has been sent to the second terminal device, receive the second registration instruction from the second terminal device; and
in a case where the predetermined screen data request is received from the second terminal device after the first registration instruction has been received from the first terminal device, send second screen data to the second terminal device, the second screen data representing a second screen in which selection of the predetermined button is disabled.

9. The specific communication device as in claim 1, further comprising a memory,
wherein the controller is further configured to:
in a case where an import instruction not according to the registration program and third authentication information are received from the second terminal device, store the third authentication information in the memory, wherein the third authentication information is authentication information which a third terminal device has obtained from the predetermined server according to the registration program; and
in a case where a third registration instruction not according to the registration program is received from the second terminal device after the third authentication information has been stored in the memory, send a third registration request including the specific identification information and the third authentication information in the memory to the predetermined server without sending the authentication information request to the predetermined server.

10. The specific communication device as in claim 1, wherein
the controller comprises:
a task for receiving the first registration instruction and the first authentication information from the first terminal device; and
a different task for sending the first registration request to the predetermined server,
wherein the task supplies the first registration instruction to the different task after supplying the first authentication information to the different task.

11. A non-transitory computer-readable recording medium storing computer-readable instructions for a specific communication device:
the computer-readable instructions, when executed by a processor of the specific communication device, cause the specific communication device to:
in a case where a first registration instruction according to a registration program and first authentication information are received from the first terminal device comprising the registration program, send a first registration request including specific identification information for identifying the specific communication device and the first authentication information to a predetermined server, wherein the registration program is a program for registering, in the predetermined server, a plurality of pieces of identification information for identifying a plurality of communication devices including the specific communication device, and the first authentication information is authentication information which the first terminal device has obtained from the predetermined server according to the registration program;

in a case where a second registration instruction not according to the registration program is received from a second terminal device, send an authentication information request to the predetermined server;

in a case where the authentication information request is sent to the predetermined server, receive second authentication information from the predetermined server; and in a case where the second authentication information is received from the predetermined server, send a second registration request including the specific identification information and the second authentication information to the predetermined server.

\* \* \* \* \*